United States Patent
Ueda

(10) Patent No.: US 7,411,626 B2
(45) Date of Patent: Aug. 12, 2008

(54) IMAGE ACQUIRING APPARATUS AND IMAGE ACQUIRING METHOD

(75) Inventor: Hitoshi Ueda, Hachioji (JP)

(73) Assignee: Olympus Corporation, Tokyo (JP)

( * ) Notice: Subject to any disclaimer, the term of this patent is extended or adjusted under 35 U.S.C. 154(b) by 801 days.

(21) Appl. No.: 10/391,734

(22) Filed: Mar. 19, 2003

(65) Prior Publication Data

US 2004/0017487 A1 Jan. 29, 2004

(30) Foreign Application Priority Data

Mar. 22, 2002 (JP) ............................ 2002-082014

(51) Int. Cl.
*H04N 5/238* (2006.01)

(52) U.S. Cl. ............... 348/364; 348/79; 348/222.1; 348/297; 348/333.11

(58) Field of Classification Search ............... 348/145, 348/208.13, 221.1, 222.1, 264, 79, 80, 239, 348/296, 297, 333.01, 333.11, 333.12, 362, 348/364, 365

See application file for complete search history.

(56) References Cited

U.S. PATENT DOCUMENTS

| | | | | |
|---|---|---|---|---|
| 4,947,239 A * | 8/1990 | Kondou et al. | ............... | 257/680 |
| 5,214,513 A * | 5/1993 | Lee | ............... | 348/207.99 |
| 5,455,621 A * | 10/1995 | Morimura | ............... | 348/229.1 |
| 5,754,226 A * | 5/1998 | Yamada et al. | ............... | 348/219.1 |
| 5,818,612 A * | 10/1998 | Segawa et al. | ............... | 358/494 |
| 6,215,522 B1 * | 4/2001 | Rouge et al. | ............... | 348/315 |
| 6,256,066 B1 * | 7/2001 | Yukawa et al. | ............... | 348/340 |
| 6,359,648 B1 * | 3/2002 | Fukasaka | ............... | 348/208.99 |
| 6,359,651 B1 * | 3/2002 | Yokonuma | ............... | 348/370 |
| 6,392,761 B1 * | 5/2002 | Suzuki et al. | ............... | 358/473 |
| 6,577,341 B1 * | 6/2003 | Yamada et al. | ............... | 348/272 |
| 6,580,528 B1 * | 6/2003 | Imoto et al. | ............... | 358/497 |
| 6,839,087 B1 * | 1/2005 | Sato | ............... | 348/362 |
| 6,958,778 B2 * | 10/2005 | Fukushima | ............... | 348/363 |
| 7,161,629 B2 * | 1/2007 | Suzuki et al. | ............... | 348/362 |
| 2001/0012069 A1 * | 8/2001 | Derndinger et al. | ............... | 348/295 |
| 2001/0035908 A1 * | 11/2001 | Kim | ............... | 348/221 |
| 2001/0048467 A1 * | 12/2001 | Fiedler | ............... | 348/79 |
| 2002/0122133 A1 * | 9/2002 | Ejima | ............... | 348/362 |

FOREIGN PATENT DOCUMENTS

| JP | 6-225317 A | 8/1994 |
|---|---|---|
| JP | 07-322152 A | 12/1995 |
| JP | 09-284626 A | 10/1997 |

* cited by examiner

*Primary Examiner*—Tuan Ho
*Assistant Examiner*—Chriss S Yoder, III
(74) *Attorney, Agent, or Firm*—Frishauf, Holtz, Goodman & Chick, P.C.

(57) ABSTRACT

An image acquiring apparatus includes a pixel shifting section which changes the relative position between luminous flux incident on an imaging element and the imaging element to a plurality of specific positions, an imaging section which photographs in at least one of a plurality of specific positions including an initial position, an image creating section which creates a high-resolution new image based on at least one item of image data photographed by the imaging section, and a display control section which displays at least one image photographed by the imaging section before the high-resolution new image has been created.

18 Claims, 11 Drawing Sheets

IMAGE ACQUIRING APPARATUS AND IMAGE ACQUIRING METHOD

CROSS-REFERENCE TO RELATED APPLICATION

This application is based upon and claims the benefit of priority from the prior Japanese Patent Application No. 2002-082014, filed Mar. 22, 2002, the entire contents of which are incorporated herein by its reference.

BACKGROUND OF THE INVENTION

1. Field of the Invention

This invention relates to an image acquiring apparatus with a pixel shifting function and an image acquiring method.

2. Description of the Related Art

An image acquiring apparatus, such as an electronic camera, records optically photographed images in the form of digital data. The resolution of an image to be recorded is generally determined by the number of pixels in an imaging element used in the image acquiring apparatus. To photograph specimens under a microscope, high-resolution images are required, depending on the type of specimens to be photographed. However, an image acquiring apparatus with a high-resolution imaging element increases the cost.

A method of obtaining high-resolution images by using images photographed with the shifted pixels has been proposed. With this method, it is possible to obtain high-resolution images by use of an inexpensive, compact image acquiring apparatus without increasing the number of pixels in the imaging element.

An image acquiring apparatus with a pixel shifting function processes images as follows. A plurality of images are photographed in such a manner that the spatial relative position between an optical image formed on the imaging element and the imaging element is shifted with an image pitch of one pixel or less. Then, the plurality of images and the image photographed without shifting the pixels are processed. This image processing makes it possible to obtain an image with a resolution higher than that obtained by the imaging element. With the image acquiring apparatus, images photographed without shifting the pixels can also be obtained (Jpn. Pat. Appln. KOKAI Publication No. 6-225317).

BRIEF SUMMARY OF THE INVENTION

According to a first aspect of the present invention, there is provided an image acquiring apparatus comprising: a pixel shifting section which changes the relative position between luminous flux incident on an imaging element and the imaging element to a plurality of specific positions; an imaging section which photographs in at least one of a plurality of specific positions including an initial position; an image creating section which creates a high-resolution new image based on at least one item of image data photographed by the imaging section; and a display control section which displays at least one image photographed by the imaging section before the high-resolution new image has been created.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
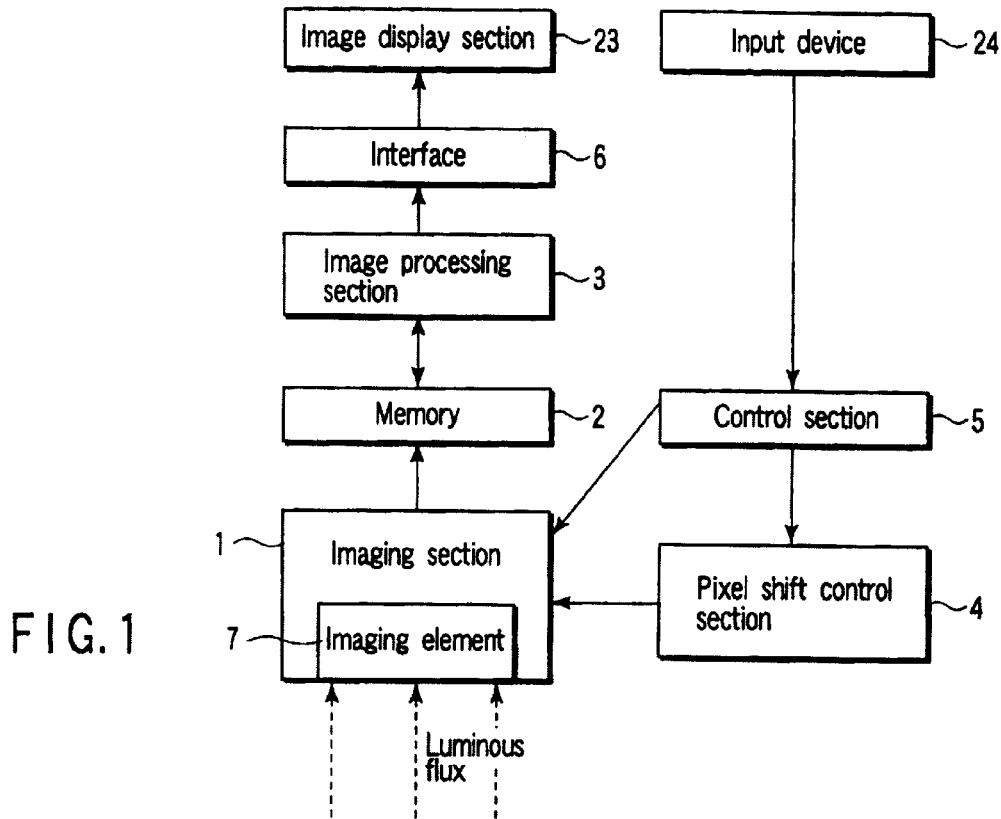
FIG. 1 shows the configuration of a first embodiment of an image acquiring apparatus according to the present invention.

FIG. 1 shows the configuration of a first embodiment of an image acquiring apparatus according to the present invention.

The image acquiring apparatus comprises an imaging section 1, a memory 2, an image processing section 3, a pixel shift control section 4, a control section 5, an interface 6, an image display section 23, and an input device 24.

The imaging section 1 includes an imaging element 7. The imaging section 1 converts an incident luminous flux photoelectrically into analog data by use of the imaging element 7, then converts the analog data into digital data with an Analogto-Digital converter, and outputs the digital data as digital image data (hereinafter, referred to as image data). The image data outputted from the imaging section 1 is recorded in the memory 2.

The image processing section 3 reads the image data recorded in the memory 2. After processing the image, the image processing section 3 transfer the processed image data back to the memory 2. The image processing section 3 reads the image data from the memory 2 and outputs it to the interface 6.

The interface 6 outputs the image data read by the image processing section 3 to another image recording device, an image display device, or the like via, for example, a PCI bus. In the first embodiment, the interface 6 is connected to the image display section 23. The image display section 23 displays the image data sent by the interface 6 in the form of images.

The input device 24 is used to input various instructions to the image acquiring apparatus. The input device 24 is connected to the control section 5. The input device 24 inputs a process stop instruction given by the operator to the control section 5 in the form of a signal.

The control section 5 supervises a pixel shifting process. The control section 5 outputs a signal for controlling the movement of the imaging element 7 via the pixel shift control section 4. The pixel shift control section 4 moves the imaging element 7 in a horizontal direction and in a vertical direction. Furthermore, the control section 5 stops the pixel shifting process. That is, the control section 5 outputs a process stop signal to the imaging section 1 and pixel shift control section 4 during the pixel shifting process.

Figure 2:
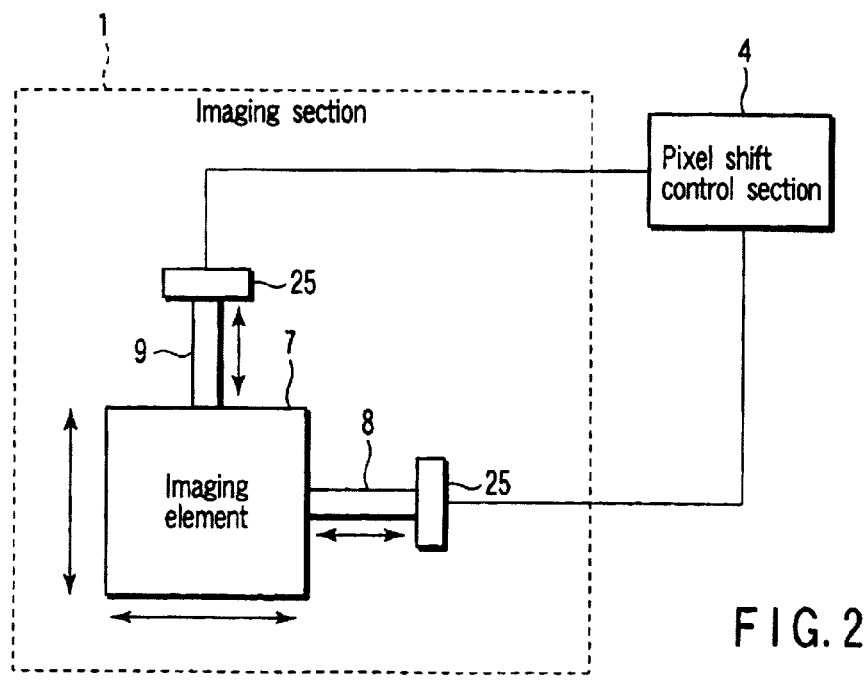
FIG. 2 shows the configuration of an imaging section in the first embodiment of the present invention.

FIG. 2 shows the configuration of the imaging section 1 in the first embodiment of the present invention.

The imaging section 1 includes the imaging element 7 in which light-receiving elements are arranged two-dimensionally. A piezoelectric element 8 moves the imaging element 7 in a horizontal direction on the basis of the signal from the pixel shift control section 4. A piezoelectric element 9 moves the imaging element 7 in a vertical direction. Then, the other end of each of the piezoelectric elements 8, 9 is bonded to a guide 25 fixed to the imaging section 1.

The pixel shift control section 4 applies a voltage corresponding to the signal inputted from the control section 5 to the piezoelectric elements 8 and 9. According to the magnitude of the applied voltage, the piezoelectric elements 8 and 9 expand and contract, on the contrary the guide 25 as a fixed point does not move. As a result, the imaging element 7 is moved to the desired position.

Figure 3:
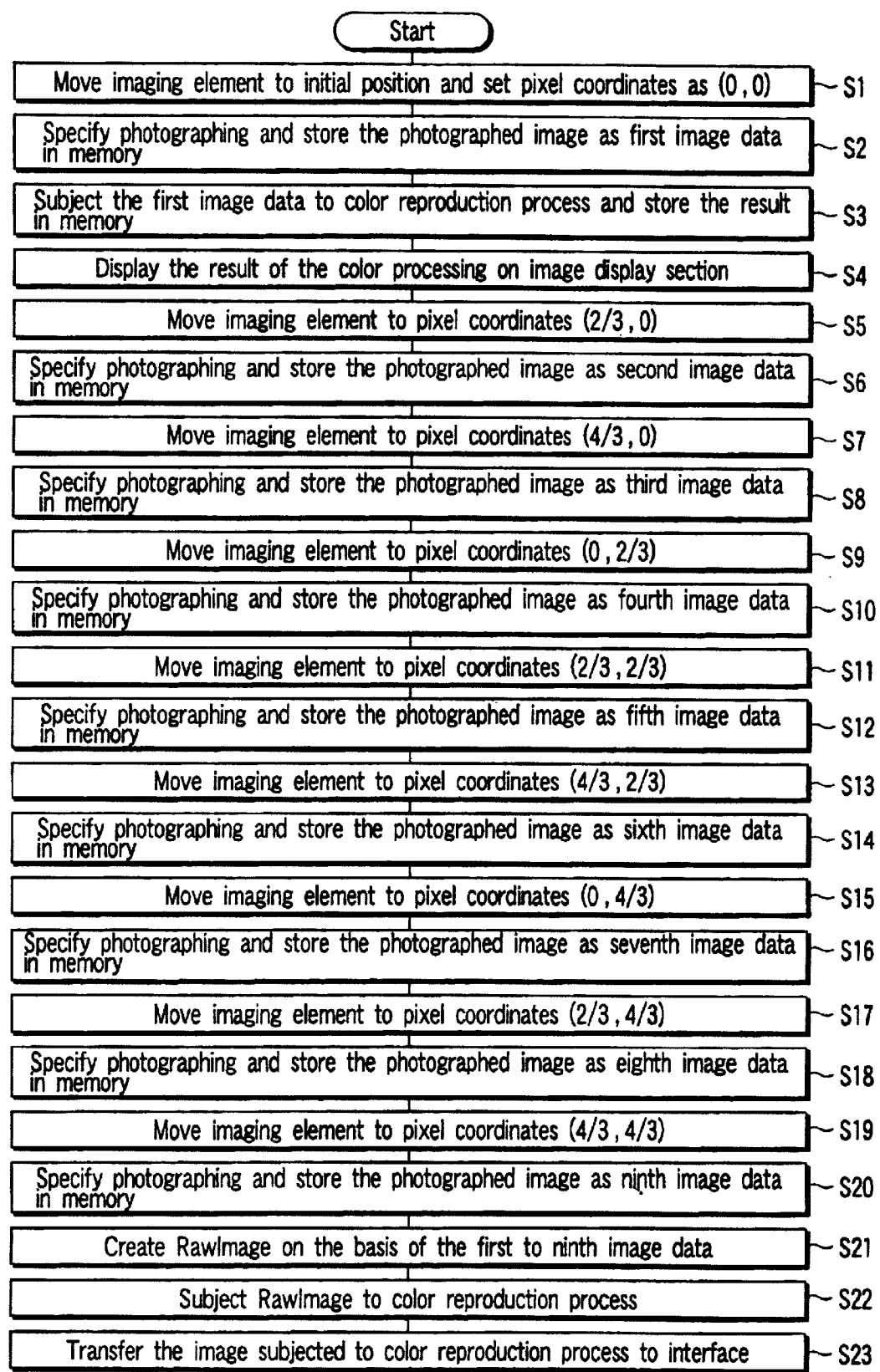
FIG. 3 is a flowchart showing an image acquiring procedure in the first embodiment.

FIG. 3 is a flowchart to help explain a rough procedure for the image acquiring apparatus in the first embodiment.

In step S1, the control section 5 outputs an instruction signal to move the imaging element 7 to an initial position to the pixel shift control section 4. The pixel shift control section 4 applies specific voltages to the two piezoelectric elements 8 and 9. As a result, each piezoelectric element expands and contracts, thereby moving the imaging element 7 to the initial position.

In the explanation below, the position of the imaging element 7 is represented as coordinates in pixels. For example, the coordinates of the initial position are expressed as (0, 0). The coordinates of the position moved ⅔ of a pixel from the initial position in the horizontal direction and ⅘ pixels in the vertical direction are expressed as (⅔, ⅘).

Figure 4:
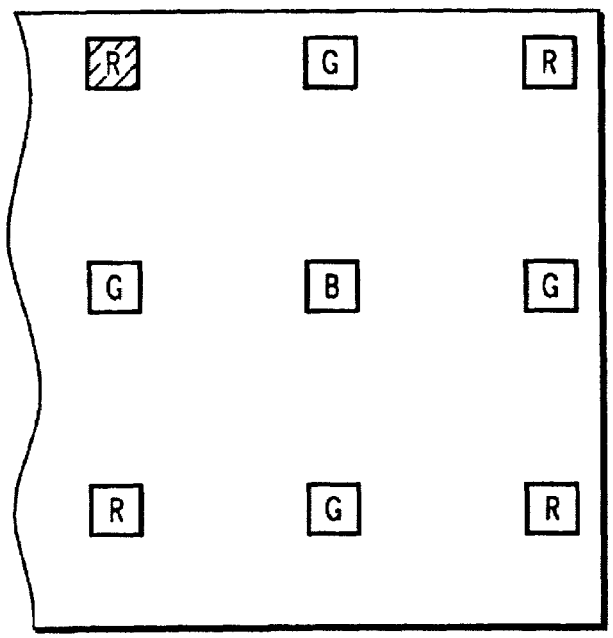
FIG. 4 shows an arrangement of the light-receiving elements in the imaging element in the initial position.

FIG. 4 shows an arrangement of the light-receiving elements in the imaging element 7 in the initial position.

Here, one rectangle denotes one light-receiving element. The individual rectangles are arranged with a spacing of one pitch of pixel between them. "R" indicates a light-receiving element to create red luminance data with an R filter. "G" indicates a light-receiving element to create green luminance data with a G filter. "B" indicates a light-receiving element to create blue luminance data with a B filter.

In step S2, after moving the imaging element 7 to the initial position, the control section 5 sets an exposure time in the imaging section 1. Then, the control section 5 outputs a photograph start signal to is the imaging section 1. Receiving the photograph start signal, the imaging section 1 exposes the imaging element 7 for the set exposure time and outputs the image data obtained by photoelectric conversion to the memory 2. The memory 2 records the image data as first image data photographed in the initial position. At this time, the control section 5 stores the exposure time used for the photographing in its internal register.

In step S3, the image processing section 3 creates a color image by subjecting the first image data (Raw data) to a color reproduction process and records the color image in the memory 2. Because the color reproduction process is a known process and does not characterize the present invention, a detailed explanation will be omitted. This invention is not limited to a specific color reproduction process.

In step S4, the color image stored in the memory 2 is sent to the image display section 23 via the interface 6. The color image is displayed as the photographed image on the image display section 23. The function of sending the photographed image to the image display section 23 to enable the operator to check the image before obtaining an image processed with a high resolution in the pixel shifting process is hereinafter called a precapture function. An image processed so as to be displayed on the image display section 23 is hereinafter called a precapture image.

Referring to the precapture image displayed on the image display section 23, the operator can check the exposure time, focus state, and others. When determining that the precapture image is unacceptable, the operator inputs an instruction to stop the remaining process to the input device 24.

When receiving the stop instruction, the input device 24 outputs a process stop signal to the control section 5. The control section 5 outputs a process stop signal to the pixel shift control section 4 and the imaging section 1. As a result, the imaging section 1 and the pixel shift control section 4 stop the subsequent processing operations (or at least one of the pixel shifting operation, photographing operation, and image creating operation).

While the operator is checking the precapture image, the control section 5 and pixel shift control section 4 continue the pixel shifting process. The case where a process stop instruction is inputted after the first pixel shifting was done has been explained. However, since the operator takes time to check the precapture image, the image shifting process is often continued at the time when an instruction to stop the process is inputted. Even in this case, the process stopping operation is carried out as described above.

In step S5, the control section 5 outputs a signal to the pixel shift control section 4 so as to shift the imaging element 7 by ⅔ of a pixel from the initial position in the horizontal direction. Receiving the signal, the pixel shift control section 4 applies a voltage to the piezoelectric element 8, thereby shifting the imaging element 7 by ⅔ of a pixel in the horizontal direction.

Figure 5:
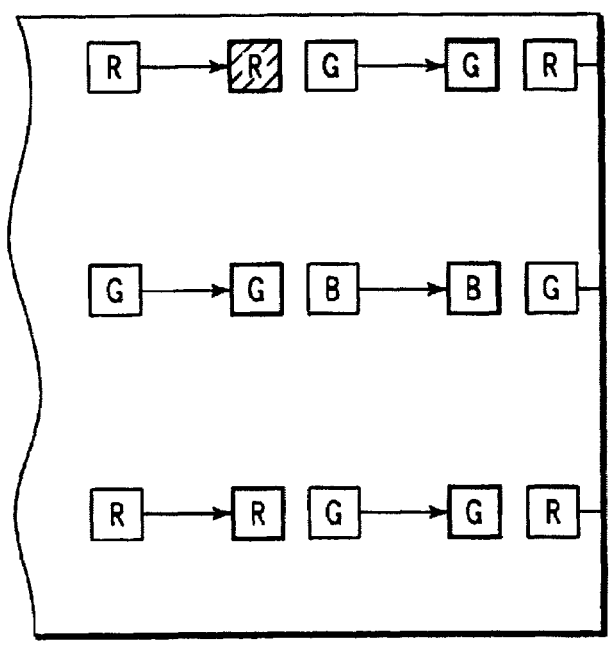
FIG. 5 shows an arrangement of the light-receiving elements in the imaging element after movement.

FIG. 5 shows an arrangement of the light-receiving elements in the imaging element 7 after movement.

A rectangle in the position from which the arrow starts shows the position of a light-receiving element before pixel shifting. A rectangle in the position at which the arrow arrives shows the position of a light-receiving element when the imaging element 7 is shifted by ⅔ of a pixel in the horizontal direction. Because FIG. 5 and each of subsequent drawings to help explain pixel shifting show models to help explain how the imaging element 7 moves, the size of a pixel, the distance between pixels, the movement, and others are not necessarily represented accurately.

Next, the control section 5 reads the exposure time used for the photographing from its internal register and sets it in the imaging section 1. Then, in step S6, the control section 5 outputs a photograph start signal to the imaging section 1. The imaging section 1 exposes the imaging element 7 for the set exposure time and outputs the image data obtained by photoelectric conversion to the memory 2. The memory 2 records the image data in the form of second image data obtained by moving the imaging element 7 by ⅔ of a pixel in the horizontal direction and then photographing the image data.

Figure 6:
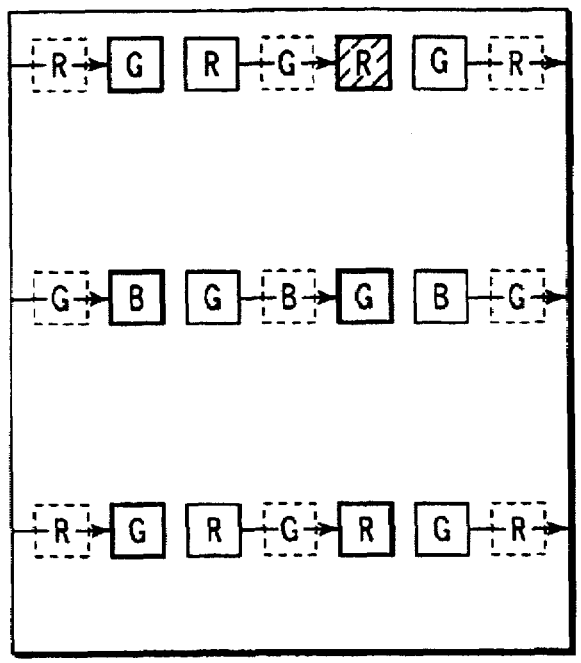
FIG. 6 shows an arrangement of the light-receiving elements in the imaging element after movement.

Similarly, in step S7, the imaging element 7 is moved 4/3 pixels from initial position in the horizontal direction as shown in FIG. 6. In step S8, third image data photographed in that position is recorded in the memory 2. In FIG. 6 and subsequent drawings, a history of the positions of the light-receiving elements moved up to now is also drawn.

Figure 7:
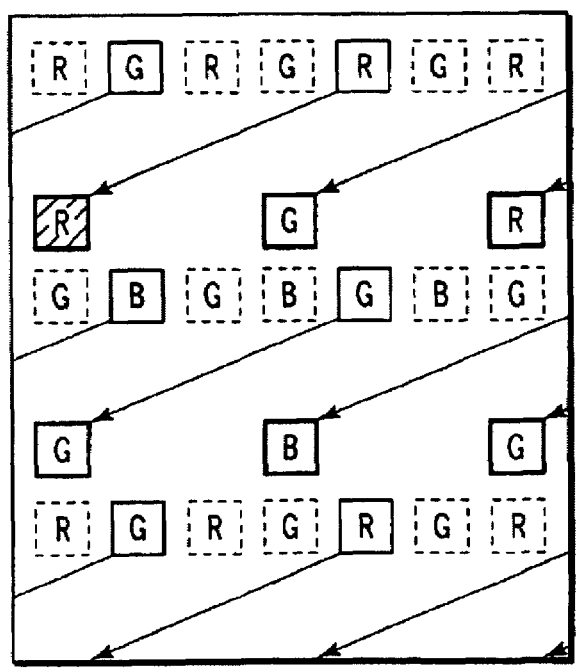
FIG. 7 shows an arrangement of the light-receiving elements in the imaging element after movement.

In step S9, the imaging element 7 is moved ⅔ of a pixel from the initial position in the vertical direction as shown in FIG. 7. In step S10, fourth image data photographed in that position is recorded in memory 2.

Figure 8:
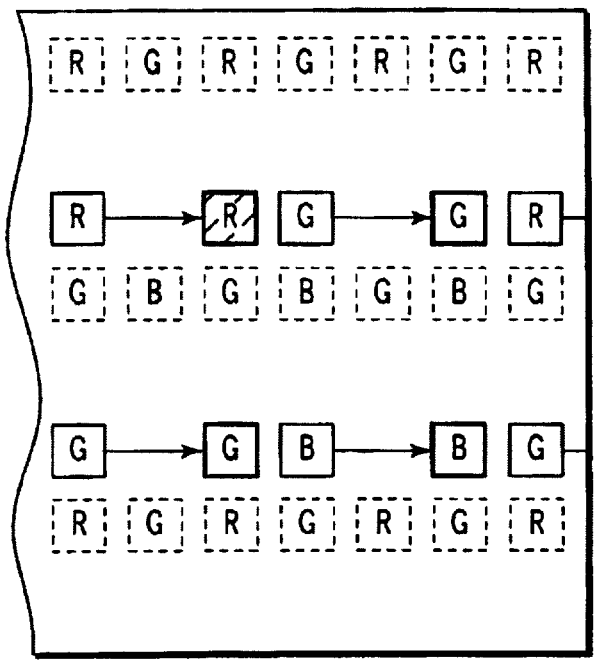
FIG. 8 shows an arrangement of the light-receiving elements in the imaging element after movement.

In step S11, the imaging element 7 is moved ⅔ of a pixel from the initial position in the vertical direction and ⅔ of a pixel in the horizontal position as shown in FIG. 8. In step S12, fifth image data photographed in that position is recorded in memory 2.

Figure 9:
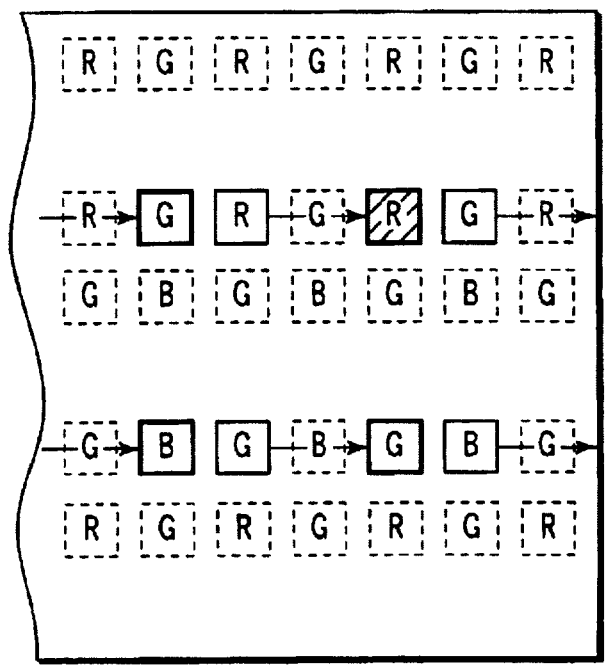
FIG. 9 shows an arrangement of the light-receiving elements in the imaging element after movement.

In step S13, the imaging element 7 is moved ⅔ of a pixel from the initial position in the vertical direction and 4/3 pixels in the horizontal position as shown in FIG. 9. In step S14, sixth image data photographed in that position is recorded in memory 2.

Figure 10:
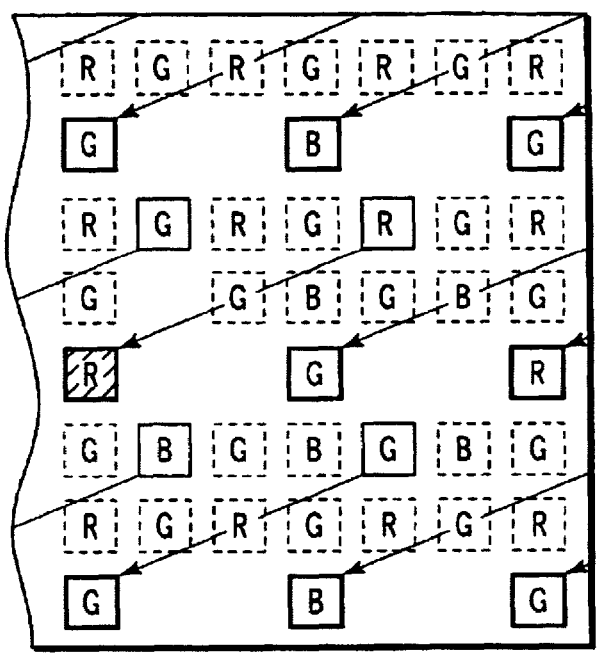
FIG. 10 shows an arrangement of the light-receiving elements in the imaging element after movement.

In step S15, the imaging element 7 is moved 4/3 pixels from the initial position in the vertical direction as shown in FIG. 10. In step S16, seventh image data photographed in that position is recorded in memory 2.

Figure 11:
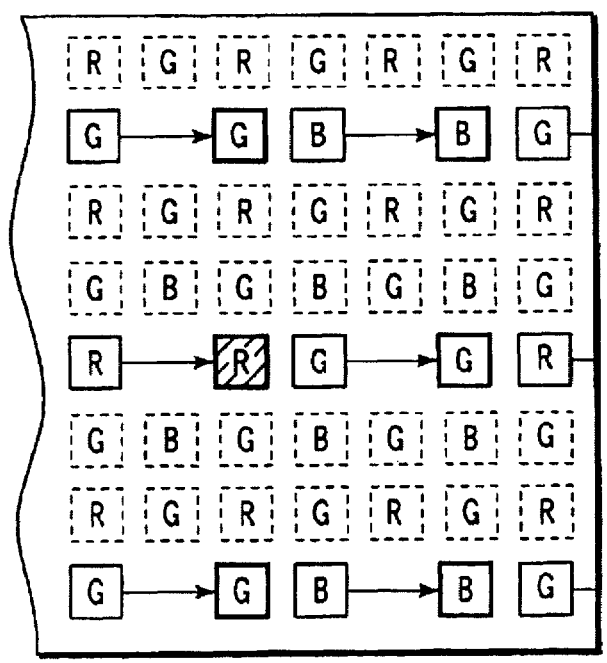
FIG. 11 shows an arrangement of the light-receiving elements in the imaging element after movement.
Figure 12:
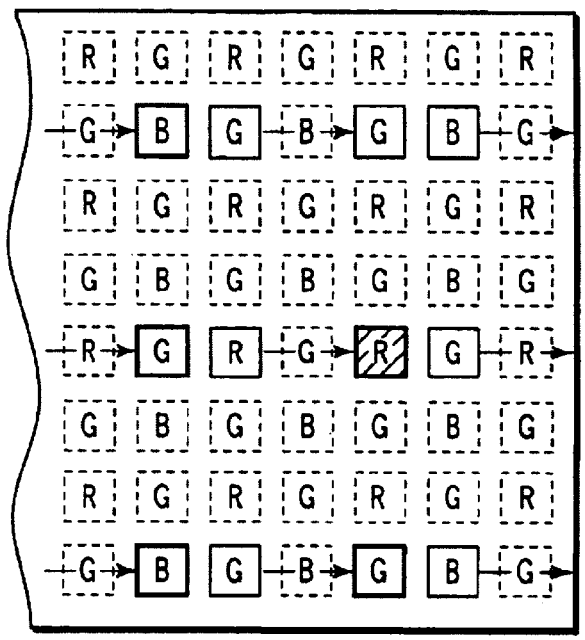
FIG. 12 shows an arrangement of the light-receiving elements in the imaging element after movement.

In step S17, the imaging element 7 is moved 4/3 pixels from the initial position in the vertical direction and ⅔ of a pixel in the horizontal position as shown in FIG. 11. In step S18, eighth image data photographed in that position is recorded in memory 2.

In step S19, the imaging element 7 is moved 4/3 pixels from the initial position in the vertical direction and 4/3 pixels in the horizontal position. In step S20, ninth image data photographed in that position is recorded in memory 2.

In step S21, on the basis of the first to ninth image data obtained through the above procedure, the image processing section 3 creates RawImage constituting a Bayer image. In step S22, this image is subjected to color reproduction, thereby forming a color image. Then, this color image is recorded as a final photographed image in the memory 2. Then, in step S23, the image is sent via the interface 6 to the image display device or another image recording device.

Since the color reproduction process does not characterize the present invention similarly with the formation of a precapture image, its detailed explanation will be omitted. This invention is not limited to a specific color reproduction process.

As described above, with the image acquiring apparatus of the first embodiment, to display and output the image photographed by initial pixel shifting, the operator can check the image to be photographed before the actual process by pixel shifting is completed.

As a result, the operator checks the photographed image in the early stages. When determining that the photographing has failed, the operator can stop the subsequent processes. Therefore, there is no need to wait for the pixel shifting to be completed.

In the first embodiment, an example of the color image high-resolution process has been explained. The present invention is not limited to the color image high-resolution process and, of course, is applicable to a monochromatic image high-resolution processing.

Next, a second embodiment of the present invention will be explained.

Unlike the first embodiment, the second embodiment photographs only for precapture. Specifically, an image is photographed in a shorter time than the actual exposure time and the brightness of each pixel of the image is corrected. Then, a precapture image as bright as that photographed using a suitable exposure time is obtained. Thereafter, photographing is done by actual pixel shifting with the suitable exposure time.

Figure 13:
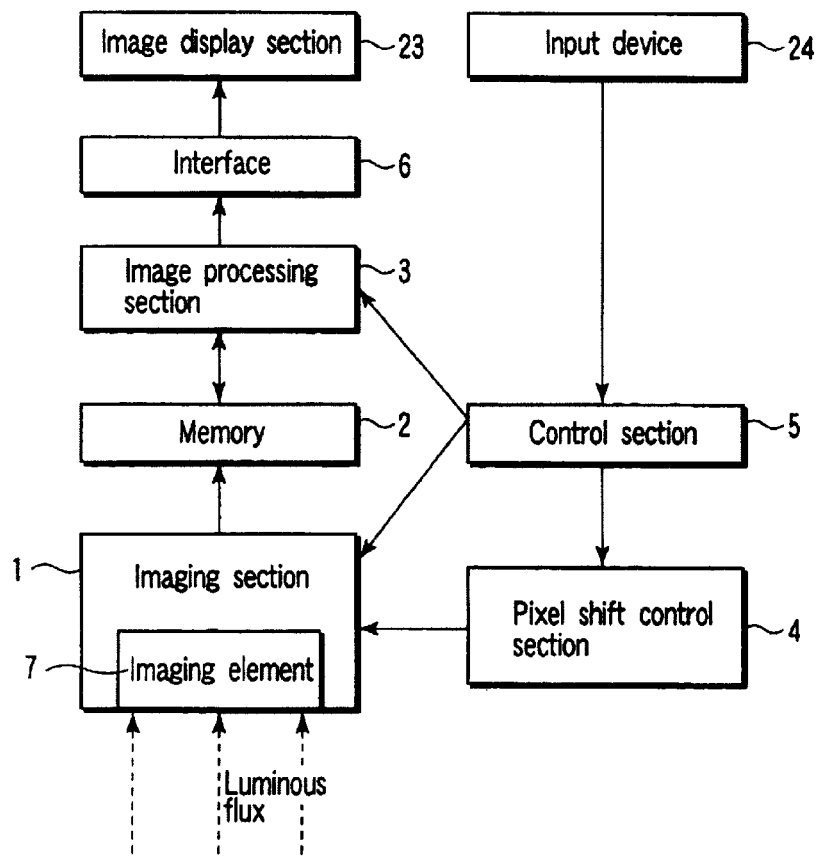
FIG. 13 shows the configuration of one other embodiment of the image acquiring apparatus according to the present invention.

FIG. 13 shows the configuration of the second embodiment of the image acquiring apparatus according to the present invention. An apparatus of the second embodiment has almost the same configuration as that of the first embodiment, except that the control section 5 can refer to the value in the internal register of the image processing section 3.

In the second embodiment, the control section 5 has the function (automatic exposure function) of estimating the exposure time on the basis of the image data acquired from the imaging section 1. The imaging section 1 photographs with an exposure time specified by the control section 5 and then transfers the photoelectrically converted image data to the memory 2. The image processing section 3 calculates the brightness of a given area of the image data and stores the result in the internal register of the image processing section 3. The control section 5 refers to the value in the register and estimates an exposure time used for next photographing.

Figure 14:
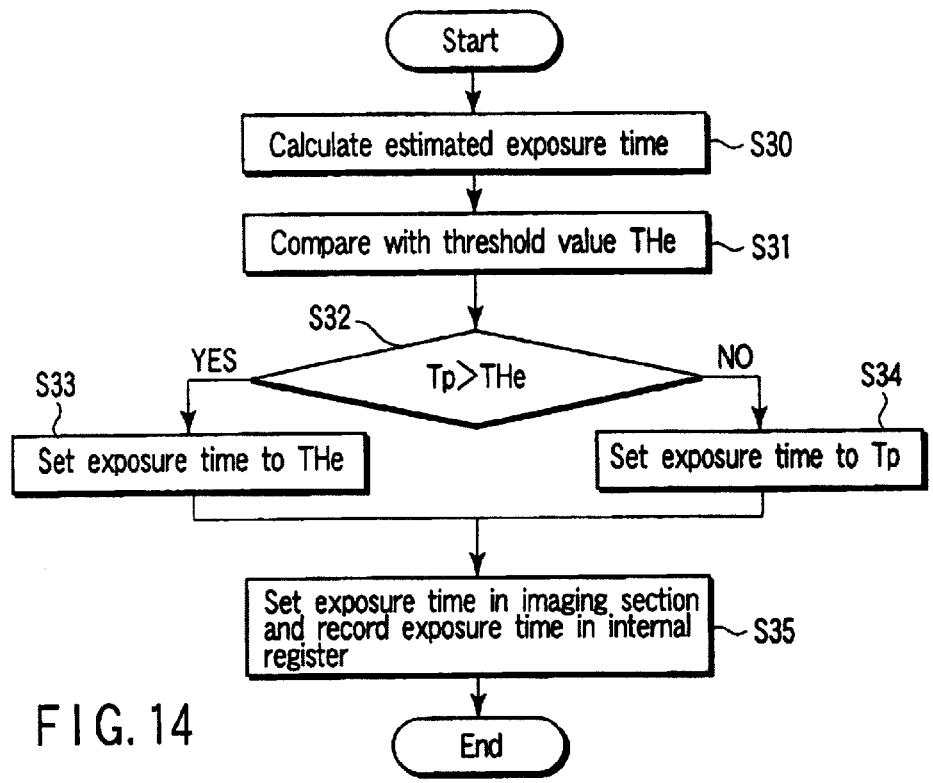
FIG. 14 is a flowchart for estimating the exposure time of the control section.

FIG. 14 is a schematic flowchart showing the procedure for estimating the exposure time of the control section 5.

In step S30, the control section 5 calculates exposure time Tp to be used for next photographing. Specifically, when the calculated value stored in the internal register of the image processing section 3 is lighter than a suitable brightness, the control section 5 makes a correction to shorten the specified exposure time. When the value is darker than the suitable brightness, the control section 5 makes a correction to lengthen the exposure time.

In step S31, the control section 5 compares the estimated exposure time Tp with a preset threshold value THe. If Yes in step S32, that is, if the estimated exposure time Tp is larger than the threshold value THe, THe is used as the exposure time for next photographing in step S33. On the other hand, if No in step S32, that is, if the estimated exposure time Tp is equal to or less than the threshold value THe, Tp is used as the exposure time for next photographing in step S34.

Then, the exposure time for next photographing is set in the imaging section 1 and its value is recorded in the internal register of the control section 5. Next, the control circuit carries out a precapture operation.

Figure 15:
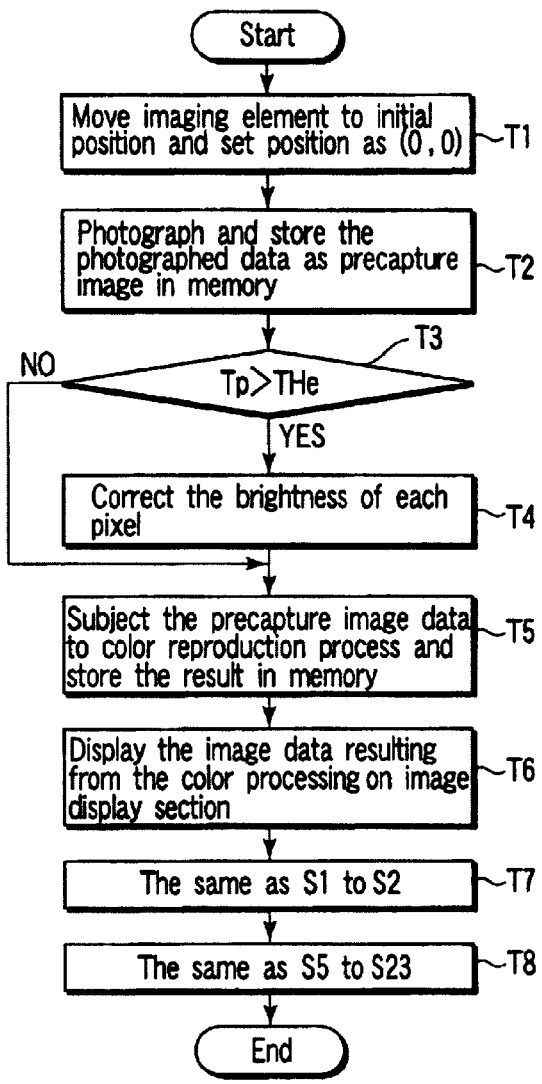
FIG. 15 is a flowchart showing an image acquiring procedure in the one other embodiment.

FIG. 15 is a flowchart showing a rough procedure for the image acquiring apparatus in the second embodiment.

In step T1, the control section 5 outputs an instruction signal to move the imaging element 7 to the initial position to the pixel shift control section 4. Receiving the signal, the pixel shift control section 4 applies voltages to the two piezoelectric elements 8 and 9. As a result, each of the piezoelectric elements expands and contracts, thereby moving the imaging element 7 to the initial position.

In step T2, the control section 5 outputs a photograph start signal to the imaging section 1. Receiving the photograph start signal, the imaging section 1 exposes the imaging element 7 for the set exposure time and outputs the photoelectrically converted image data to the memory 2. The memory 2 records the image data as precapture image data.

In step T3, the control section 5 checks the set exposure time. If the estimated exposure time Tp is larger than the threshold value THe, this means that the precapture image data has been obtained by photographing in a shorter time than the estimated exposure time Tp. Thus, in step T4, the brightness of each pixel is corrected so that the brightness may be equivalent to the brightness when photographing is done using the estimated exposure time Tp. The correcting method is, for example, to multiply each pixel in the precapture image data by a coefficient α (=estimated exposure time Tp/threshold value THe). If the estimated exposure time is equal to or less than the threshold value THe, this means that photographing is done using a suitable exposure time, so that it is unnecessary to correct the brightness of each pixel.

In step T5, the image processing section 3 creates a color image obtained by subjecting the precapture image data outputted from the imaging section 1 to a color reproduction process, a known process, and records the color image in the memory 2. In step T6, the color image stored in the memory 2 is sent via the interface 6 to the image display section 23, which displays it as the photographed image.

Next, the image is photographed by pixel shifting. The precapture image has already been shown to the operator. Then, in steps T7 and T8, steps S1 to S23 excluding steps S3 and S4 in the first embodiment are carried out.

As described above, with the image acquiring apparatus of the second embodiment, photographing only for precapture is done. Therefore, the operator can determine whether the image being photographed is good or bad before the actual photographing by pixel shifting is completed.

In the second embodiment, the threshold value THe is provided for the exposure time for photographing a precapture image in order to prevent the actual exposure time from becoming equal to or larger than the threshold value THe. Then, the brightness of the photographed image is corrected by the image processing. Thus, it is possible to shorten the time required to take pictures. Accordingly, when photographing is done using a long exposure time, an image with a resolution equivalent to that of the image to be photographed can be checked in the earlier stages, which helps alleviate the user's stress due to the waiting time.

Next, a third embodiment of the present invention will be explained. The apparatus of the third embodiment has the same configuration as that of the second embodiment, except that the former further has the following function: the control section 5 compares the exposure time with a preset minimum exposure time and determines whether to carry out precapture.

Figure 16:
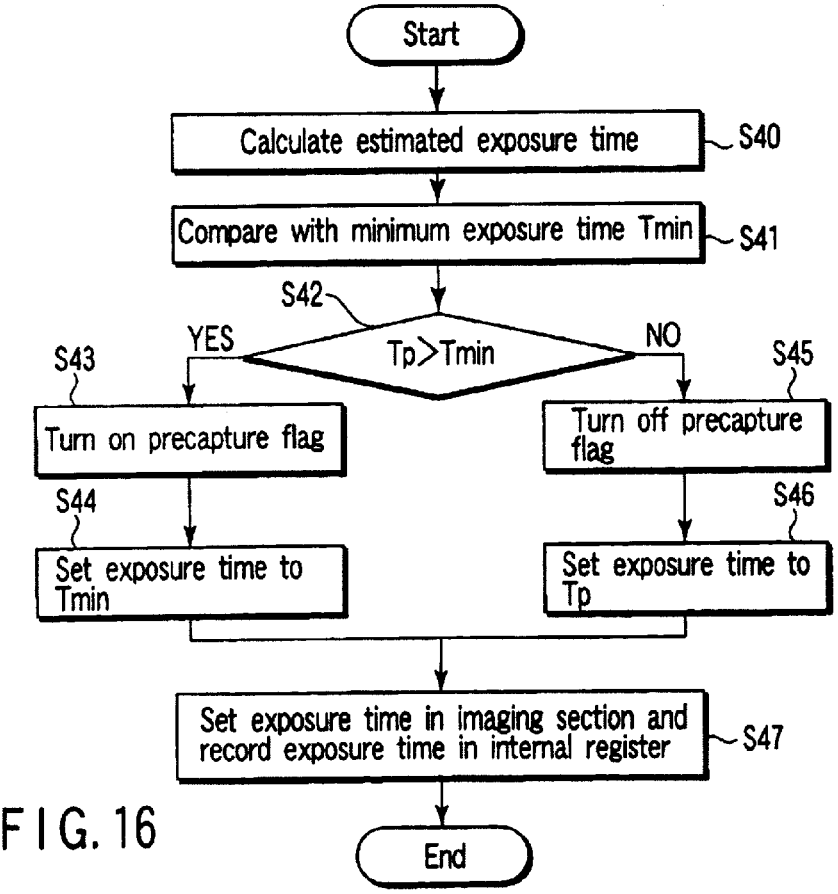
FIG. 16 is a flowchart for estimating the exposure time of the control section.

FIG. 16 is a flowchart showing a rough procedure for estimating the exposure time of the control section 5.

In step S40, if the calculated value stored in the internal register of the image processing section 3 is lighter than a proper brightness, the control section 5 makes a correction so as to shorten the previously specified exposure time. If the value is darker than the proper brightness, the control section 5 makes a correction so as to lengthen the exposure time. Then, the control section 5 calculates an estimated exposure time Tp used for next photographing.

In step S41, the control section 5 compares the estimated exposure time Tp with the preset minimum exposure time Tmin. If Yes in step S42, that is, the estimated exposure time Tp is larger than the minimum exposure time Tmin, the control section 5 turns on a precapture flag in step S43. The precapture flag is a flag in the control section 5 to indicate whether or not precapture is carried out. In step S44, the control section 5 uses Tmin as the exposure time for next photographing.

On the other hand, if No in step S42, that is, the estimated exposure time Tp is equal to or less than the minimum exposure time Tmin, the control section 5 turns off its internal precapture flag in step S45. In step S46, the control section 5 uses Tp as the exposure time for next photographing.

In step S47, the control section 5 sets the exposure time for next photographing in the imaging section 1 and records its value in the internal register of the control section 5. Then, the control section 5 makes preparations for a precapture operation and a pixel shifting operation.

Figure 17:
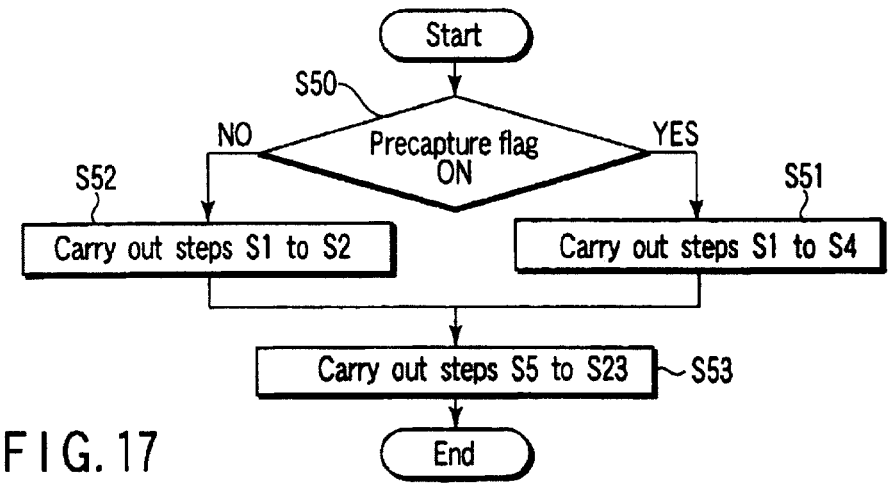
FIG. 17 is a flowchart showing an image acquiring procedure in another embodiment of the present invention.

FIG. 17 is a flowchart showing a rough procedure for the image acquiring apparatus in the third embodiment.

In step S50, the control section 5 determines whether its internal precapture flag is turn on. If Yes in step S50, that is, the flag is on, the control section 5, in step S51, carries out steps S1 to S4 of FIG. 3 in the first embodiment. That is, the control section 5 carries out the photographing of the first image data, or the pixel shifting process, and the precapture image displaying operation.

If No in step S50, that is, if the flag is off, the control section 5, in step S52, carries out steps S1 to S2 of FIG. 3 in the first embodiment. That is, the photographing of the first image data, a pixel shifting process, is performed. Since precapture is not carried out, the operation of displaying the precapture image described in steps S3 to S4 is not carried out. Then, in step S53, the pixel shifting operation described in steps S5 to S23 and the operation of creating a high-resolution image, or the subsequent processes, are carried out.

With the above configuration, when the operator does not feel the time required for pixel shifting to be long, the operator need not refer to the precapture image. Thus, if the minimum exposure time Tmin is a value corresponding to the pixel shifting time, when the operator does not feel the time required for pixel shifting to be long, it is possible to prevent the image displaying operation, the precapture function, from being carried out.

Next, a fourth embodiment of the present invention will be explained. An apparatus of the fourth embodiment has the same configuration as that of the apparatus of the third embodiment. In the apparatus of the fourth embodiment, the operator can set the minimum exposure time Tmin in advance using the input device 24. The control section 5 compares the exposure time with the minimum time Tmin set by the operator. Then, the control section 5 determines automatically whether to carry out precapture.

When the operator inputs the minimum exposure time Tmin from the input device 24, the control section 5 records the data in the internal register of the control section 5. Then, as shown in the third embodiment, after determining an estimated exposure time, the control section 5 compares the estimated exposure time with the minimum exposure time Tmin stored in the internal register. If the estimated exposure time is larger than the minimum exposure time Tmin (estimated exposure time>Tmin), the control section 5 sets its internal capture flag ON. On the other hand, if the estimated exposure time is equal to or less than the minimum exposure time Tmin (estimated exposure time≦Tmin), the control section 5 sets its internal precapture flag OFF.

The control section 5 checks to see if the internal precapture flag is ON. If the flag is ON, the control section 5 carries out steps S1 to S4 of FIG. 3 in the first embodiment. That is, the pixel shifting process is carried out and the first image data is photographed. Then, a precapture image is displayed.

If the flag is OFF, steps S1 to S2 of FIG. 3 in the first embodiment are carried out. That is, the pixel shifting process is executed and the first image data is photographed. However, steps S3 to S4 are not carried out. That is, a precapture image is not displayed.

Then, the pixel shifting operation described in steps S5 to S23, the subsequent processes, are carried out.

As described above, since the minimum exposure time Tmin can be set to the time corresponding to the pixel shifting time, it is possible to determine whether to display a precapture image, according to each operator's sense of waiting time. Therefore, the operability is improved and therefore the operator's stress during photography can be decreased.

The second, third, and fourth embodiments are configured independently or combined suitably into one configuration.

Next, a fifth embodiment of the present invention will be explained. The configuration of the fifth embodiment differs from that of the first embodiment in the configuration of the imaging section 1.

Figure 18:
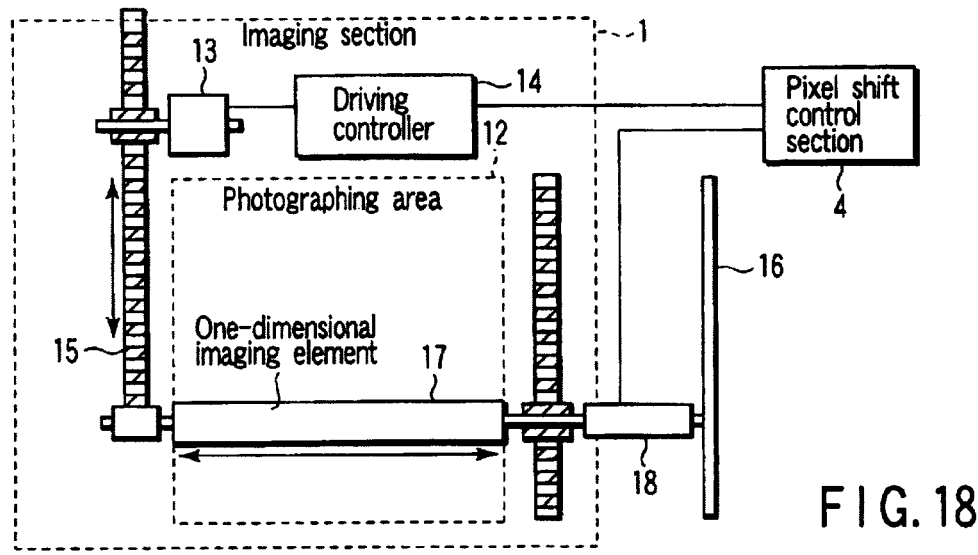
FIG. 18 shows the configuration of the imaging section in one other embodiment of the present invention.

FIG. 18 shows the configuration of the imaging section 1 in the fifth embodiment.

Figure 19:
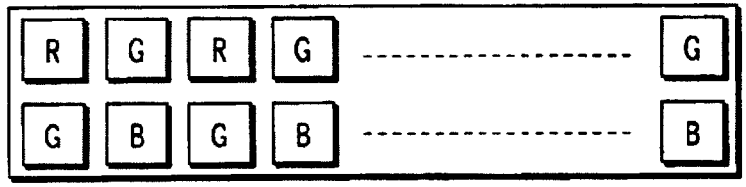
FIG. 19 shows the arrangement of RGB filters for the individual light-receiving elements in the imaging element.

In the imaging element 17, two line sensors are arranged side by side horizontally. In each line sensor, light-receiving elements are arranged one-dimensionally. As shown in FIG. 19, RGB primary color filters are provided for the individual light-receiving elements. The arrangement of them is a Bayer arrangement. In the fifth embodiment, the imaging element 17 uses a so-called Bayer primary color filter arrangement. However, the present invention does not depend on the color filter arrangement pattern of the imaging element 17. Thus, complementary color filters may be used for the light-receiving elements of the imaging element 17. Alternatively, the imaging element 17 may be a monochromatic imaging element.

The imaging element 17 is connected to the piezoelectric element 18. The piezoelectric element 18 expands and contracts on the basis of the voltage outputted from the pixel shift control section 4. Then, the imaging element 17 moves in the horizontal direction, on the contrary the guide 16 as a fixed point does not move.

The imaging section 1 has a driving device 13. The driving device 13 is controlled by a driving controller 14 operated by the signal from the pixel shift control section 4. A gear 15 is moved by the operation of the driving device 13. The imaging element 17 engaged with the gear 15 moves in parallel vertically within a photographing area 12.

Next, the operating process in the fifth embodiment will be explained.

Figure 20:
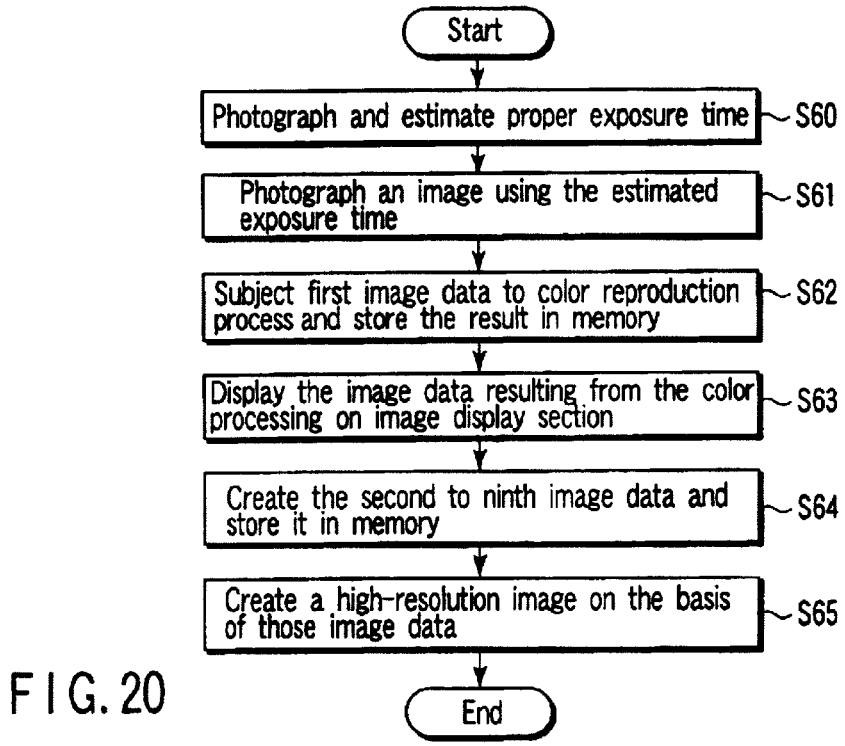
FIG. 20 is a flowchart showing an image acquiring procedure in the one other embodiment.

FIG. 20 is a flowchart showing a rough procedure for the image acquiring apparatus in the fifth embodiment.

In step S60, the image acquiring apparatus estimates a proper exposure time according to the procedure below.

With an image formed in the photographing area 12 of the imaging section 1, the control section 5 outputs a signal to move the imaging element 17 to the initial position to the pixel shift control section 4. The pixel shift control section 4 outputs a control signal to the driving controller 14. The driving controller 14 moves the imaging element 17 to the top of the photographing area 12, the initial position. Moreover, the control section 4 applies a voltage to the piezoelectric element 18, thereby moving the imaging element 17 to the initial position in the horizontal direction.

Specifically, the driving controller 14 outputs a driving signal to the driving device 13. According to the signal, the driving device 13 moves the imaging element 17 to the initial position in the vertical position. In addition, the piezoelectric element 18 expands and contracts on the basis of the voltage from the pixel shift control section 4, thereby moving the imaging element 17 to the initial position in the horizontal direction.

After the imaging element 17 moves to the initial position, the control section 5 outputs a photograph signal to the imaging section 1. Receiving the photograph signal, the imaging section 1 exposes two lines of image formed on the imaging element 17 for the exposure time set as the initial value. The imaging section 1 creates image data by carrying out a photoelectric conversion process and outputs the image data to the memory 2. The memory 2 records the obtained image data as two lines of image in the initial position.

Next, the pixel shifting section 4 outputs a control signal to the driving controller 14 so that the imaging element 17 may move by two pixels downward from the initial position. On the basis of the control signal, the driving controller 14 generates a driving signal. According to the driving signal, the driving device 13 moves the imaging element 17 two pixels from the initial position in the vertical direction. After the movement of the imaging element 17 is completed, the control section 5 output a photograph signal to the imaging section 1. The control section 5 subjects the image formed on the imaging element 17 to a photoelectric conversion process and outputs the result to the memory 2 sequentially. The memory 2 stores the signal as next two lines of image data.

From this point on, the above processes are repeated until the imaging element 17 has scanned all of the photographing area 12. As a result, the image formed in the photographing area 12 is stored in the memory 2.

Then, on the basis of the image data stored in the memory 2, the image processing section 3 calculates the brightness of a given part in the photographing area 12. Then, the result of the calculation is stored in the internal register of the image processing section 3. When the control section 5 refers to the value in the register and determines that the brightness in the given part is lighter than the proper brightness, it makes a correction so as to shorten the exposure time and estimates an exposure time. Conversely, if the brightness in the given part is darker than the proper brightness, the control section 5 makes a correction so as to lengthen the exposure time and estimates an exposure time. Then, the control section 5 stores the estimated exposure time in its internal register. After the above processes are completed, the estimation of the exposure time is finished.

In the above process, the exposure time is estimated on the basis of the image data obtained by photographing all of the photographing area 12. A specific part of the photographing area 12, for example, only the central part, may be photographed and, on the basis of the image data, an exposure time may be estimated.

In step S61, the image acquiring apparatus photographs an image with the estimated exposure time according to the procedure below.

To carry out a photographing operation, the control section 5 outputs a signal to move the imaging element 17 to the initial position to the pixel shift control section 4. The pixel shift control section 4 outputs a control signal to the driving controller 14. Receiving the signal, the driving controller 14 moves the imaging element 17 to the top of the photographing area 12, the initial position. In addition, the pixel shift control section 4 applies a specific voltage to the piezoelectric element 18, thereby moving the imaging element 17 to the initial position in the horizontal direction.

Specifically, the driving controller 14 outputs a driving signal to the driving device 13. According to the signal, the driving device 13 moves the imaging element 17 to the target position in the vertical direction. The piezoelectric element 18 expands and contracts according to the applied voltage, thereby moving the imaging element 17 to the target position in the horizontal direction.

After the imaging element 17 moves to the initial position, the control section 5 reads the estimated exposure time from the internal register of the control section 5 and sets the exposure time in the imaging section 1. In addition, the control section 5 outputs a photograph signal to the imaging section 1.

Receiving the photograph signal, the imaging section 1 exposes two pixel lines of image formed on the imaging element 17 for the set exposure time. The imaging section 1 creates image data by carrying out a photoelectrical conversion process and outputs the image data to the memory 2. The memory 2 records the image data as two pixel lines of image in the initial position.

Next, the pixel shifting section 4 outputs a control signal to the driving controller 14. On the basis of the control signal, the driving controller 14 outputs a driving signal. According to the driving signal outputted from the driving controller 14, the driving device 13 moves the imaging element 17 two pixels from the initial position in the vertical direction.

After the imaging element 17 moves, the control section 5 outputs a photograph signal to the imaging section 1. The imaging section 1 photoelectrically converts the two pixel lines of image formed on the imaging element 17 and outputs the converted image to the memory 2 sequentially. The memory 2 stores the two pixel lines of image data as the image data in the position next to the image data in the initial position.

By carrying out the above process all over the photographing area 12, the image formed in the photographing area 12 is stored in the memory 2 as first image data.

As in the first embodiment, in step S62, the image processing section 3 uses the first image data as the Raw data outputted from the imaging section 1 and creates a color image by subjecting the Raw data to a color reproduction process, a known process. The image processing section 3 records the color image as a precapture image in the memory 2. In step S63, the precapture image is displayed on the image display section 23 via the interface 6.

In step S64, the image acquiring apparatus photographs the second to ninth image data for a pixel shifting process and stores the image data.

The control section 5 outputs a control signal to specify a shifted position to the pixel shift control section 4. Specifically, the control section 5 moves the imaging element 17 to a position shifted ⅔ of a pixel from the initial position in the horizontal direction, with the imaging element 17 remaining unchanged in the vertical direction from the initial position. The pixel shift control section 4 outputs a control signal to the driving controller 14 and moves the imaging element 17 to the same position as the initial position in the vertical direction. Furthermore, a voltage is applied to the piezoelectric element 18, thereby moving the imaging element 17 to a position shifted ⅔ of a pixel from the initial position in the horizontal direction. After the movement of the imaging element 17 is completed, the two pixel lines of image formed on the imaging element 17 are photographed.

From this point on, photographing is done sequentially in such a manner that the imaging element 17 is moved in units of two pixel lines in the vertical direction and two pixel lines of image data are transferred to the memory 2 sequentially. By carrying out the above processes all over the photographing area 12, the second image data in the same position as the initial position in the vertical direction and in a position shifted ⅔ of a pixel from the initial position in the horizontal direction is recorded in the memory 2.

Similarly, third image data in the same position as the initial position in the vertical direction and in a position shifted ⁴⁄₃ pixels in the horizontal direction is recorded in the memory 2. Fourth image data shifted ⅔ of a pixel from the initial position in the vertical direction is recorded in the memory 2. Fifth image data shifted ⅔ of a pixel from the initial position in the vertical direction and ⅔ of a pixel in the horizontal direction is recorded in the memory 2. Sixth image data shifted ⅔ of a pixel from the initial position in the vertical direction and ⁴⁄₃ pixels in the horizontal direction is recorded in the memory 2. Seventh image data shifted ⁴⁄₃ pixels from the initial position in the vertical direction is recorded in the memory 2. Eighth image data shifted ⁴⁄₃ pixels from the initial position in the vertical direction and ⅔ of a pixel in the horizontal direction is recorded in the memory 2. Ninth image data shifted ⁴⁄₃ pixels from the initial position in the vertical direction and ⁴⁄₃ pixels in the horizontal direction is recorded in the memory 2.

In step S65, on the basis of the image data created in this way, a high-resolution image is formed. Specifically, on the basis of the first to ninth image data stored in the memory 2, the image processing section 3 constructs a Bayer image. The image processing section 3 creates a color image by subjecting the Bayer image to a color reproduction process, a known process, and records the color image as a final photographed image in the memory 2. The image is transferred via the interface 6 to the image display device, or another image recording device.

As described above, in the fifth embodiment, the image acquiring apparatus has the pixel shifting function composed of one-dimensional imaging elements. The image acquiring apparatus is configured to show an image photographed by initial pixel shifting to the operator. This enables the user to determine whether the photographed image is good or bad before the photographing of all the image data by pixel shifting is completed.

When determining by reference to the displayed image that the photographed image is unacceptable, the user inputs a process stop to the input device 24. Receiving the process stop instruction from the user, the input device 24 outputs a signal to the control section 5. The control section 5 outputs a process stop signal to the pixel shift section control section 4 and the imaging section 1. Receiving the signal, the imaging section 1 and pixel shift control section 4 stop the subsequent processing operations (including at least one of the pixel shifting operation, photographing operation, and image creating operation).

As explained in the first embodiment, the control section 5 and the pixel shift control section 4 continue the processing operation, while the operator is referring to the displayed image. Even when the first image is displayed, the operator takes time to refer to the image. Accordingly, it is generally in the middle of processing the subsequent image data that the process stop is specified. In this case, too, the process stop operation is carried out as described above.

Next, a sixth embodiment of the present invention will be explained.

An apparatus of the sixth embodiment has the same configuration as that of the apparatus of the fifth embodiment except for the following point: the apparatus of the sixth embodiment corrects the brightness of an image photographed to estimate an exposure time, on the basis of the initial exposure time and the estimated exposure time; then, the apparatus shows the corrected image as a precapture image to the operator. That is, the apparatus of the sixth embodiment differs from that of the fifth embodiment in that the estimation of the exposure time and the creation of the precapture image are made at the same time.

The image acquiring apparatus of the sixth embodiment photographs an image using the initial value of the exposure time and determines an estimated exposure time on the basis of the image. At this time, on the basis of the relationship between the estimated exposure time and the initial value of the exposure time used in photographing the image, the control section 5 instructs the image processing section 3 to correct the brightness of each pixel of the obtained image.

According to the instruction, the image processing section 3 corrects the brightness of each pixel. The correcting method may be, for example, to correct the brightness by multiplying the value of each pixel by the ratio $\alpha$ (=estimated exposure time/initial exposure time) of the estimated exposure time to the initial value of the exposure time.

Hereinafter, the image processing section 3 creates a color image by subjecting the image to a color reproduction process and records the color image as a precapture image in the memory 2. Then, the image processing section 3 displays the precapture image on the image display section 23 via the interface 6.

The image processing section 3 then creates a high-resolution image by photographing by the pixel shifting and transfers the resulting image to the image display section via the interface 6.

As described above, in the sixth embodiment, photographing for the estimation of the exposure time and photographing for the creation of the precapture image can be combined into one process. Thus, in the image acquiring apparatus with the pixel shifting function composed of one-dimensional imaging elements, the time required to show the precapture image to the operator can be shortened further.

Next, a seventh embodiment of the present invention will be explained. In the seventh embodiment, to shift the positional relationship between the luminous flux and the imaging element 7 of the imaging section 1 in the horizontal direction and in the vertical direction, the course of light incident on the imaging element 7 is changed.

Figure 21:
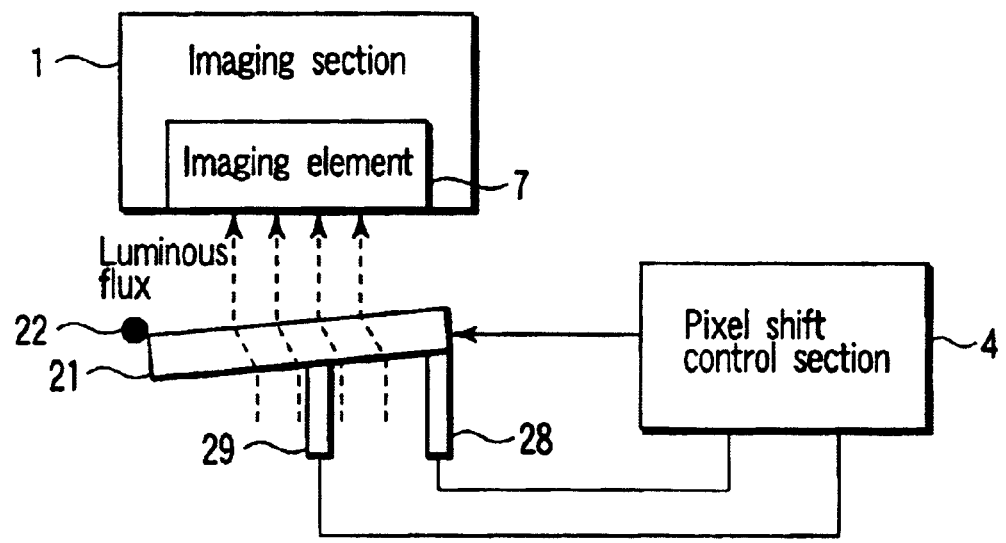
FIG. 21 shows another configuration of the pixel shifting device.

FIG. 21 shows another configuration of the pixel shifting device.

In FIG. 21, a parallel flat plate 21 for allowing luminous flux to pass through is provided between the imaging element 7 and a light source. Changing the angle of the parallel flat plate 21 causes the optical path to change, with the result that the relative positional relationship between the luminous flux incident on the imaging element 7 and the imaging element 7 changes.

Here, as means for changing the angle of the parallel flat plate 21, a piezoelectric element 28 for shifting pixels in the horizontal direction and a piezoelectric element 29 for shifting pixels in the horizontal direction are provided for the parallel flat plate 21. The voltage applied to the piezoelectric elements is controlled by the pixel shift control section 4, thereby changing the angle of the parallel flat plate 21, which modifies the optical path of the luminous flux incident on the imaging element 7.

Figure 22:
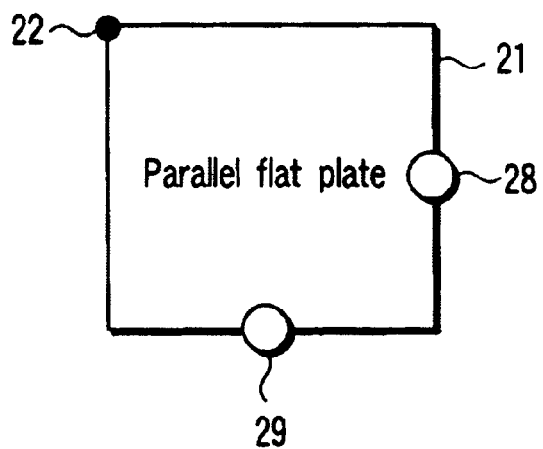
FIG. 22 is a plan view showing the arrangement of a parallel flat plate and piezoelectric elements.

FIG. 22 is a plan view showing the arrangement of the parallel flat plate 21 and piezoelectric elements.

The parallel flat plate 21 is supported by a support 22, the piezoelectric element 28 for shifting pixels in the horizontal direction, and the piezoelectric element 29 for shifting pixels in the vertical direction. In the pixel shift control section 4, each of the piezoelectric elements 28, 29 expands and contracts on the basis of the value of the applied voltage. With the support 22 as a fulcrum, its inclination changes. As a result, the luminous flux passing through the parallel flat plate 21 forms an image in a position shifted in the horizontal and vertical directions on the imaging element 1.

Next, the operation of the image acquiring apparatus according to the seventh embodiment will be explained.

On the basis of an instruction from the control section 5, the pixel shift control section 4 adjusts the inclination of the parallel flat plate 21 and photographs first image data in the initial position. Then, as in the first embodiment, the image processing section 3 creates a color image by subjecting the first image data to a color reproduction process. The image processing section 3 records the color picture as a precapture image in the memory 2. The image processing section 3 displays the precapture image on the image display section 23 via the interface 6.

Similarly, second image data in the same position as the initial position in the vertical direction and in a position shifted ⅔ of a pixel in the horizontal direction is photographed and then recorded in the memory 2. Third image data in the same position as the initial position in the vertical direction and in a position shifted ⁴⁄₃ pixels in the horizontal direction is photographed and then recorded in the memory 2. Fourth image data shifted ⅔ of a pixel from the initial position in the vertical direction is photographed and then recorded in the memory 2. Fifth image data shifted ⅔ of a pixel from the initial position in the vertical direction and ⅔ of a pixel in the horizontal direction is photographed and then recorded in the memory 2. Sixth image data shifted ⅔ of a pixel from the initial position in the vertical direction and ⁴⁄₃ pixels in the horizontal direction is photographed and then recorded in the memory 2. Seventh image data shifted ⁴⁄₃ pixels from the initial position in the vertical direction is photographed and then recorded in the memory 2. Eighth image data shifted ⁴⁄₃ pixels from the initial position in the vertical direction and ⅔ of a pixel in the horizontal direction is photographed and then recorded in the memory 2. Ninth image data shifted ⁴⁄₃ pixels from the initial position in the vertical direction and ⁴⁄₃ pixels in the horizontal direction is photographed and then recorded in the memory 2.

After the first to ninth image data are stored in the memory 2, the image processing section 3 constructs a Bayer image from the image data. The image processing section 3 creates a color image by subjecting the Bayer image to a color reproduction process, a known process, and records the color image as a final high-resolution photographed image in the memory 2. The image is transferred via the interface 6 to the image display device or another image recording device.

In the seventh embodiment, the image acquiring apparatus has the pixel shifting function composed of a parallel flat plate. Showing the image photographed by the initial pixel shifting to the operator enables the operator to check the photographed image before the actual photographing by pixel shifting is completed.

When the operator determines that the photographed image is unacceptable after checking whether the photographed image is acceptable, referring to the precapture image, the operator inputs an instruction to stop the process to the input device 24. Receiving the instruction, the input device 24 outputs a signal to the control section 5. The control section 5 outputs a process stop signal to the pixel shift control section 4 and the imaging section 1. Receiving the signal, the imaging section 1 and pixel shift control section 4 stop the subsequent processing operations (at least one of the pixel shifting operation, photographing operation, and image creating operation).

In the seventh embodiment, because the operator can check the photographed image in the early stages, he or she feels less stress due to the waiting time. When the operator has determined that the photographing has failed, he or she can stop the processing operation. Accordingly, the operator need not wait until the process of shifting all the pixels has been completed.

The seventh embodiment may be configured independently or combined with any one of the above embodiments suitably.

In the seventh embodiment, the pixels have been shifted nine times as an example of pixel shifting. The present invention is not limited to this and may be applied to a case where the pixels are shifted any given number of times.

This invention explained in the above embodiments is particularly suitable for an image acquiring apparatus for microscopes.

For instance, in fluorescent observation or dark field observation, since the image is such that an object to be observed gleams on a black background, the average luminance of the image is very low. In the case of such an image, the exposure time for one frame may exceed several tens of seconds to one minute. Since photographing an image observed under the microscope requires a high resolution, it is desirable to effect pixel shifting, but the total exposure time may exceed 10 minutes. With the present invention, however, it is possible to check whether the photographing is done properly, even in the middle of photographing by pixel shifting.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image acquiring apparatus for use with a microscope, the apparatus comprising:
    a pixel shifting section which changes a relative position between an imaging element and a luminous flux incident on the imaging element to a plurality of specific positions by two-dimensionally driving the imaging element;
    an imaging section which performs photographing with the imaging element in the plurality of specific positions including an initial position;
    an image creating section which creates a high-resolution new image based on a set of image data photographed by the imaging section;
    a display control section which displays a pre-captured image photographed first by the imaging section before the image creating section completes creation of the high-resolution new image;
    an input section which inputs a stop instruction to stop an image acquiring operation currently under execution;
    an operation stop section which stops operation of the pixel shifting section, the imaging section, and the image creating section in response to the stop instruction from the input section; and
    an exposure estimating section which estimates a proper exposure time by referring to both the imaging section and the image creating section,
    wherein the imaging section comprises a short exposure imaging section which photographs the pre-captured image using a predetermined short exposure time that is shorter than the estimated exposure time when the estimated exposure time is longer than a predetermined exposure time, and a correction section which corrects a brightness of the pre-captured image in accordance with a ratio of the estimated exposure time to the predetermined short exposure time when the predetermined short exposure time is used in photographing the pre-captured image.

2. An image acquiring apparatus according to claim 1, wherein the display control section comprises a display limit section which prevents the pre-captured image from being displayed when the estimated exposure time is shorter than a predetermined minimum exposure time.

3. An image acquiring apparatus according to claim 2, wherein the predetermined minimum exposure time is changeable.

4. The image acquiring apparatus according to claim 1, wherein the imaging section photographs an observation image observed by the microscope.

5. The image acquiring apparatus according to claim 1, wherein the predetermined exposure time is the predetermined short exposure time.

6. The image acquiring apparatus according to claim 1, wherein the correction section corrects the brightness of the pre-captured image by multiplying each pixel in the pre-captured image by the ratio of the estimated exposure time to the predetermined short exposure time, when the predetermined short exposure time is used in photographing the pre-captured image.

7. An image acquiring method for an image acquiring apparatus for use with a microscope, the method comprising:
    performing a pixel shifting operation of changing a relative position between an imaging element and a luminous flux incident on the imaging element to a plurality of specific positions by two-dimensionally driving the imaging element;
    performing an imaging operation, by an imaging section of the microscope, of photographing with the imaging element in the plurality of specific positions including an initial position;
    performing an image creating operation, by an image creating section of the microscope, of creating a high-resolution new image based on a set of image data photographed in the imaging operation;
    performing a display control operation of displaying a pre-captured image photographed first in the imaging operation before the image creating operation is performed;
    detecting input of a stop instruction to stop an image acquiring operation currently under execution;
    stopping the pixel shifting operation, the imaging operation, and the image creating operation in response to detection of the stop instruction; and
    performing an exposure estimating operation of estimating a proper exposure time by referring to both the imaging section and the image creating section, wherein the imaging operation comprises photographing the pre-captured image using a predetermined short exposure time that is shorter than the estimated exposure time when the estimated exposure time is longer than a predetermined exposure time, and correcting a brightness of the pre-captured image in accordance with a ratio of the estimated exposure time to the predetermined short exposure time when the predetermined short exposure time is used in photographing the pre-captured image.

8. An image acquiring method according to claim 7, wherein the display control operation comprises preventing the pre-captured image from being displayed when the estimated exposure time is shorter than a predetermined minimum exposure time.

9. The image acquiring method according to claim 8, wherein the predetermined minimum exposure time is changeable.

10. An image acquiring method according to claim 7, wherein the imaging operation photographs an observation image observed by the microscope.

11. An image acquiring method according to claim 7, wherein the predetermined exposure time is the predetermined short exposure time.

12. An image acquiring method according to claim 7, correcting the brightness of the pre-captured image comprises multiplying each pixel in the pre-captured image by the ratio of the estimated exposure time to the predetermined short exposure time, when the predetermined short exposure time is used in photographing the pre-captured image.

13. An image acquiring apparatus for use with a microscope, the apparatus comprising:
pixel shifting means for changing a relative position between an imaging element and a luminous flux incident on the imaging element to a plurality of specific positions by two-dimensionally driving the imaging element;
imaging means for performing photographing with the imaging element in the plurality of specific positions including an initial position;
image creating means for creating a high-resolution new image based on a set of image data photographed by the imaging means;
display control means for displaying a pre-captured image photographed first by the imaging means before the image creating means creates the high-resolution new image;
input means for inputting a stop instruction to stop an operation currently under execution;
operation stop means for stopping the pixel shifting means, the imaging means, and the image creating means in response to the stop instruction from the input means; and
exposure estimating means for estimating a proper exposure time by referring to both the imaging means and the image creating means,
wherein the imaging means comprises short exposure imaging means for photographing the pre-captured image using a predetermined short exposure time that is shorter than the estimated exposure time when the estimated exposure time is longer than a predetermined exposure time, and correction means for correcting a brightness of the pre-captured image in accordance with a ratio of the estimated exposure time to the predetermined short exposure time when the predetermined short exposure time is used in photographing the pre-captured image.

14. An image acquiring apparatus according to claim 13, wherein the display control means comprises display limit means for preventing the pre-captured image from being displayed when the estimated exposure time is shorter than a predetermined minimum exposure time.

15. The image acquiring apparatus according to claim 14, wherein the predetermined minimum exposure time is changeable.

16. The image acquiring apparatus according to claim 13, wherein the imaging means photographs an observation image observed by the microscope.

17. The image acquiring apparatus according to claim 13, wherein the predetermined exposure time is the predetermined short exposure time.

18. The image acquiring apparatus according to claim 13, wherein the correction means corrects the brightness of the pre-captured image by multiplying each pixel in the pre-captured image by the ratio of the estimated exposure time to the predetermined short exposure time, when the predetermined short exposure time is used in photographing the pre-captured image.

* * * * *